BEST AVAILABLE COPY

BEST AVAILABLE COPY

78

J. O. Leach.

Improvement in Looms.

No. 159. Patented Mar. 3, 1857.

See Looms, Page

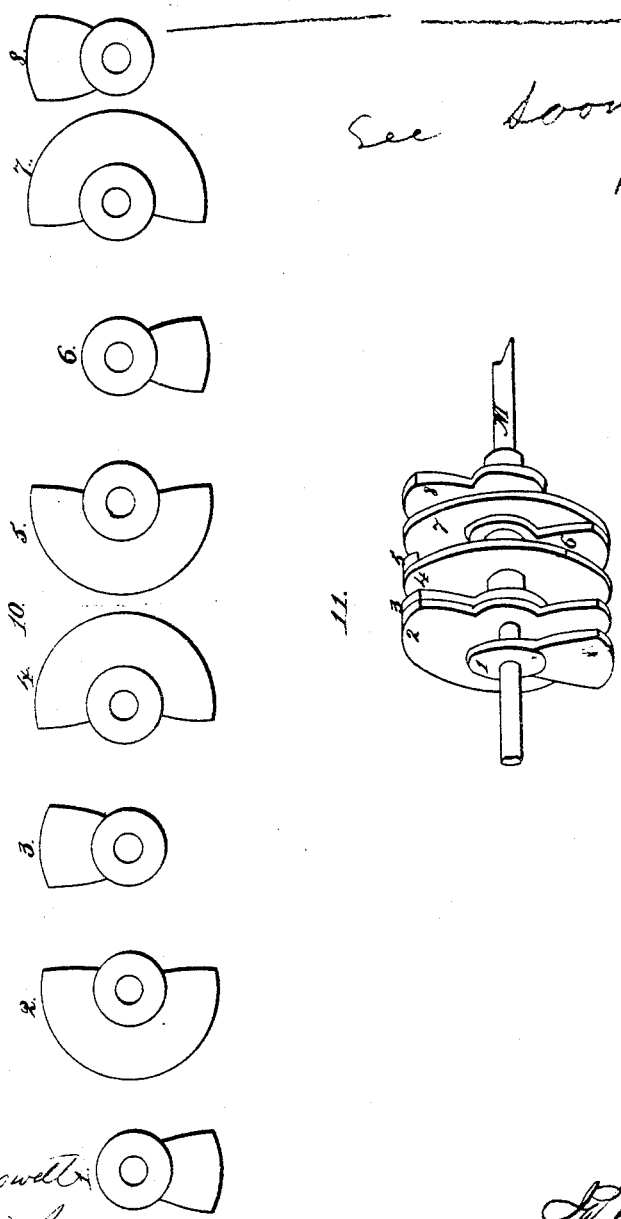

Witnesses:
David Maxwell
Wm. Graham Jr.

Inventor:
J. O. Leach

No. 159, to original Letters Patent No. 13,724.—*For Improvement in Looms.*—I claim the change in the relative position of cams 2 and 4—6 and 8, in the manner and for the purposes substantially as set forth in the above specification.

H. PETERS, PHOTO-LITHOGRAPHER, WASHINGTON, D. C.